(12) United States Patent
Nakagawa

(10) Patent No.: US 11,798,415 B2
(45) Date of Patent: Oct. 24, 2023

(54) METHODS AND SYSTEMS FOR IDENTIFYING EFFICIENT PARKING SPOTS FOR SOLAR CHARGING

(71) Applicant: Toyota Motor Engineering & Manufacturing North America, Inc., Plano, TX (US)

(72) Inventor: Masashi Nakagawa, Sunnyvale, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 148 days.

(21) Appl. No.: 17/471,643

(22) Filed: Sep. 10, 2021

(65) Prior Publication Data

US 2023/0079514 A1  Mar. 16, 2023

(51) Int. Cl.
| | |
|---|---|
| *G08G 1/14* | (2006.01) |
| *G01C 21/36* | (2006.01) |
| *B60L 58/13* | (2019.01) |
| *G01C 21/34* | (2006.01) |

(52) U.S. Cl.
CPC ............. *G08G 1/145* (2013.01); *B60L 58/13* (2019.02); *G01C 21/3469* (2013.01); *G01C 21/3682* (2013.01); *G01C 21/3694* (2013.01)

(58) Field of Classification Search
CPC ..... G08G 1/145; B60L 58/13; G01C 21/3469; G01C 21/3682; G01C 21/3694
See application file for complete search history.

(56) References Cited

U.S. PATENT DOCUMENTS

| | | | |
|---|---|---|---|
| 10,168,170 B2 | 1/2019 | North et al. | |
| 2011/0191266 A1* | 8/2011 | Matsuyama | G06Q 50/06 |
| | | | 705/412 |
| 2012/0271723 A1* | 10/2012 | Penilla | B60L 53/80 |
| | | | 705/16 |
| 2013/0285841 A1* | 10/2013 | Kirsch | G08G 1/143 |
| | | | 340/932.2 |
| 2014/0297072 A1 | 10/2014 | Freeman | |
| 2015/0298565 A1 | 10/2015 | Iwamura et al. | |
| 2016/0117926 A1 | 4/2016 | Alkavaram et al. | |
| 2016/0180712 A1 | 6/2016 | Rosen et al. | |
| 2019/0031038 A1 | 1/2019 | Pursifull et al. | |
| 2019/0248243 A1* | 8/2019 | Gaither | B60L 8/003 |
| 2020/0217679 A1 | 9/2020 | Deluca et al. | |

FOREIGN PATENT DOCUMENTS

| | | |
|---|---|---|
| EP | 2879899 B1 | 12/2020 |
| JP | 2014063492 A | 10/2014 |
| KR | 1020150035794 A | 7/2015 |
| WO | 2020115357 A1 | 11/2020 |

* cited by examiner

*Primary Examiner* — Mohamed Barakat
(74) *Attorney, Agent, or Firm* — DINSMORE & SHOHL LLP

(57) ABSTRACT

A method includes receiving a request from a requesting vehicle to locate a parking spot having capacity to receive solar power, determining a parking location having the capacity to receive solar power, based on a location of the requesting vehicle, the request, and a parking map that indicates an expected charging rate at each of a plurality of parking locations, and transmitting the determined parking location to the requesting vehicle.

17 Claims, 5 Drawing Sheets

METHODS AND SYSTEMS FOR IDENTIFYING EFFICIENT PARKING SPOTS FOR SOLAR CHARGING

TECHNICAL FIELD

The present specification relates to a parking location system, and more particularly, to methods and systems for identifying efficient parking spots for solar charging.

BACKGROUND

Many electric or alternative fuel vehicles are in operation today. These vehicles are typically powered by a method other than the burning of gasoline. For example, alternative fuel vehicles may comprise hybrid electric vehicles, fuel cell vehicles, and the like.

One type of alternative fuel vehicle is a solar electric vehicle. A solar electric vehicle may include one or more solar panels positioned on an exterior surface of the vehicle. The solar panels may receive sunlight and generate electricity, which may be stored in a battery that is used to power the vehicle. As such, the vehicle may be charged whenever the vehicle is driving or parked outside and is exposed to sunlight.

However, certain outdoor parking spaces may be better suited for charging a solar electric vehicle than others. Accordingly, there is a need for methods and systems for identifying efficient parking spots for solar charging.

SUMMARY

In one embodiment, a method may include receiving a request from a requesting vehicle to locate a parking spot having capacity to receive solar power, determining a parking location having the capacity to receive solar power, based on a location of the requesting vehicle, the request, and a parking map that indicates an expected charging rate at each of a plurality of parking locations, and transmitting the determined parking location to the requesting vehicle.

In another embodiment, a method may include receiving data from one or more solar electric vehicles parked at one or more parking locations, the data comprising a capacity to receive solar power at each parking location, and updating a parking map indicating an expected charging rate at each of the one or more parking locations based on the received data.

In another embodiment, a remote computing device may include a controller configured to receive a request from a requesting vehicle to locate a parking spot having capacity to receive solar power, determine a parking location having the capacity to receive solar power, based on a location of the requesting vehicle, the request, and a parking map that indicates an expected charging rate at each of a plurality of parking locations, and transmit the determined parking location to the requesting vehicle.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include methods and systems for identifying efficient parking spots for solar charging. When a solar electric vehicle parks outdoors, it may begin charging a vehicle battery using solar power. As the vehicle charges the battery, the vehicle may transmit data about the charging of the battery to a server or remote computing device. The data about the charging may include the location of the vehicle and the rate at which the battery is charging. The data may also include additional information such as the date and time.

The server may receive the information from the solar electric vehicle and may store the data. Over time, the server may receive such data from a plurality of vehicles at different times and locations. Based on the data received over time, the server may generate and maintain a map of outdoor parking locations and how efficient each parking location is for charging a solar electric vehicle. For example, certain locations may be shaded and may not receive much sunlight, whereas other locations may receive abundant direct sunlight. As the server receives more data about solar electric charging, the server may continue to update the map of outdoor parking locations.

Once the server establishes a parking map as described above, a solar electric vehicle may transmit a request for parking assistance to the server. In particular, the solar electric vehicle may transmit a request for a location of an outdoor parking spot where the vehicle can charge its battery. The server may determine a suitable parking spot for the requesting vehicle based on the location of the vehicle and the parking map maintained by the server. The server may then transmit the location of the determined parking spot to the solar electric vehicle. The vehicle may then travel to the determined parking spot to park. While the vehicle is parked, the vehicle's battery may be efficiently charged via solar power.

Figure 1:
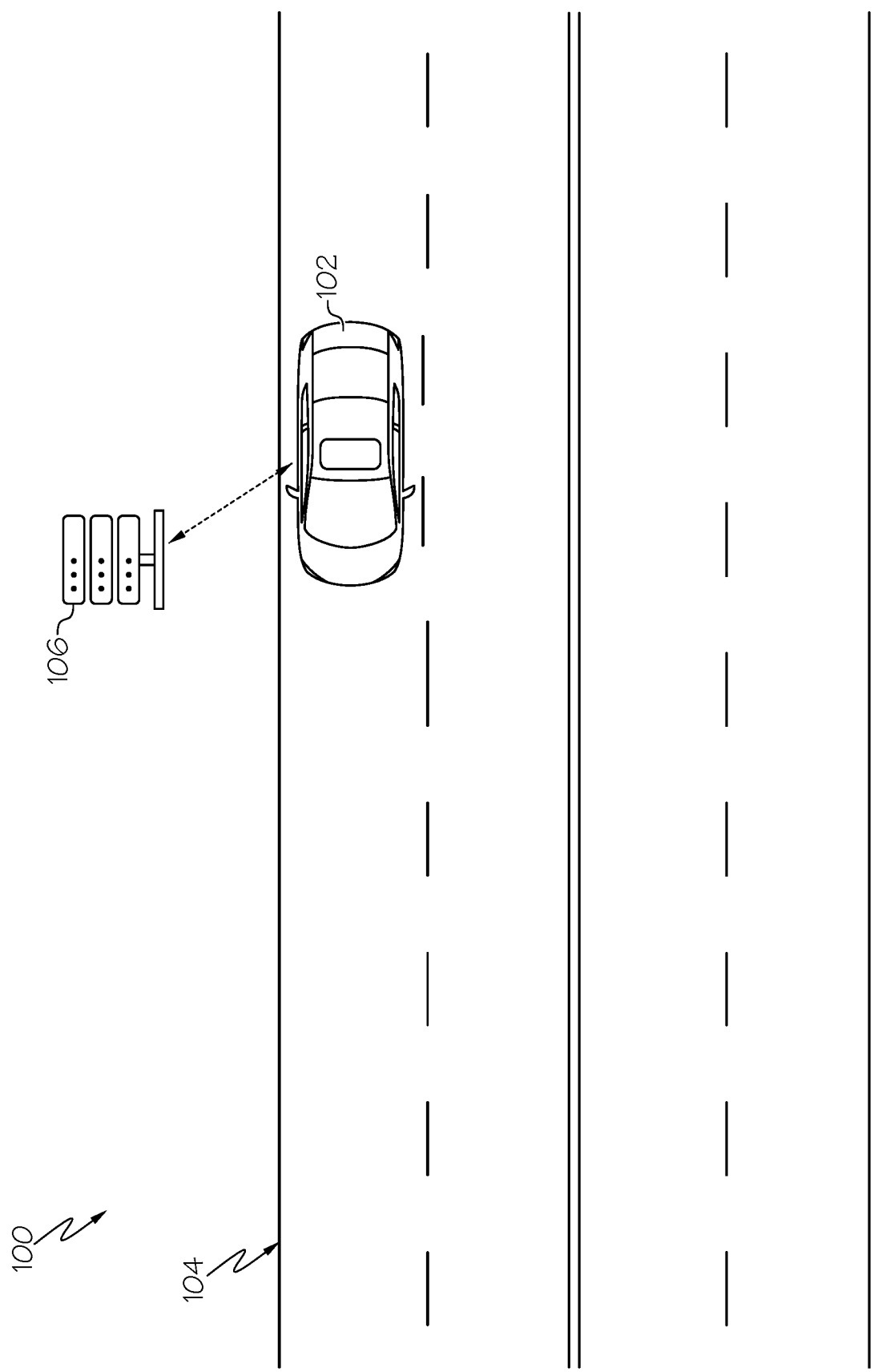
FIG. 1 depicts an example system for identifying efficient parking spots for solar charging, according to one or more embodiments shown and described herein.

Turning now to the figures, FIG. 1 shows a system 100 for identifying efficient parking spots for solar charging. In the example of FIG. 1, the system 100 includes a vehicle 102 traveling along a road 104 and a server or remote computing device 106. In the example of FIG. 1, the vehicle 102 is a solar electric vehicle. That is, the vehicle 102 is an electric vehicle with a battery that can be charged using one or more solar panels positioned on an exterior surface of the vehicle. However, in other examples, the vehicle 102 may be a vehicle that can be charged by other modalities. For example, the vehicle 102 may be an electric vehicle with a battery that can be charged by wind, vibration, and the like.

In the example of FIG. 1, the vehicle 102 may be a connected vehicle. A connected vehicle is able to communicate remotely with systems outside of the vehicle (e.g., a traffic management system or other vehicles). In particular, in the example of FIG. 1, the vehicle 102 may communicate remotely with the server 106. While the vehicle 102 in the example of FIG. 1 is an automobile, in other examples, the vehicle 102 may be any other passenger or non-passenger vehicle such as, for example, a terrestrial, aquatic, and/or airborne vehicle. In some examples, the vehicle 102 may be an unmanned aerial vehicle (UAV), commonly known as a drone. In some examples, the vehicle 102 may be a fully or partially autonomous vehicle.

The server 106 may be communicatively coupled to the vehicle 102. In the illustrated example, the server 106 comprises a cloud computing device. In some examples, the server 106 may comprise a road-side unit (RSU) positioned near the road 104. In these examples, the system 100 may include any number of RSUs spaced along the road 104 such that each RSU covers a different service area. That is, as the vehicle 102 or other vehicles drive along the road 104, the vehicles may be in range of different RSUs at different times such that different RSUs provide coverage at different locations. Thus, as vehicles drive along the road 104, the vehicles may move between coverage areas of different RSUs.

In other examples, the server 106 may be another type of server or remote computing device and may be positioned remotely from the road 104. In some examples, the server 106 may be an edge server. In some examples, the server 106 may be a moving edge server, such as another vehicle.

In the example of FIG. 1, the vehicle 102 may transmit a request for parking assistance to the server 106. In particular, the vehicle 102 may transmit a request for a location of a parking spot that has a capacity to receive solar power to efficiently charge the vehicle 102. The vehicle 102 may transmit the request with certain parameters or preferences. For example, the request may include the current location of the vehicle 102 as well as preferences for the type of parking spot desired. In one example, the request may ask for the closest parking spot that meets a minimum threshold charging rate (e.g., certain watts). In another example, the request may ask for the most efficient parking spot (e.g., the parking spot that has the highest expected rate) within a threshold distance. In other examples, the request may include preferences that specify a balance between a desired parking distance and a desired charging rate. In some examples, the request may specify a target location, which may be a location to which a driver of the vehicle is traveling (e.g., an entrance to a store or a sports facility). As explained in further detail below, the server 106 may then identify a parking spot close to the target location such that the user can park close to the desired destination and charge the vehicle 102 while parked. In some examples, the request may specify a specific time in the future for which parking is desired.

After receiving such a request, the server 106 may determine a parking spot for the vehicle 102, based on the request, and may transmit the location of the determined parking spot to the vehicle 102, as explained in further detail below. In some examples, the request may include an expected duration of parking, e.g., at least 5 hours of parking. In some examples, the request may include a minimum amount of charging required. The server 106 may identify one or more parking spots that meet the minimum amount of charging based on the charging rate of each of parking spots and the expected duration of parking. In some examples, the request may include a current charging level of the vehicle 102. Based on the current charging level, the server 106 may identify an appropriate parking spot that can provide sufficient charging to the vehicle 102. In some examples, the request may include a desired charging level (e.g., 70% of full charge). Based on the desired charging level, the server 106 may identify an appropriate parking spot that can provide sufficient charging for the vehicle 102 to reach the desired charging level.

Upon receiving a request for parking assistance from the vehicle 102, the server 106 may determine a parking spot based on a parking map of parking spots maintained by the server 106, as described in further detail below. The map of parking spots maintained by the server 106 may include locations of a plurality of parking spots and for each parking spot, the map may include an indication of the capacity for a vehicle to receive solar power at the parking spot. For example, the parking map may indicate an expected charging rate (e.g., a rate at which a vehicle can expect to charge a vehicle battery using solar power) at each location stored in the map. This indication may indicate how much sun the vehicle is expected to be exposed to when parked at a particular parking spot.

Figure 2:
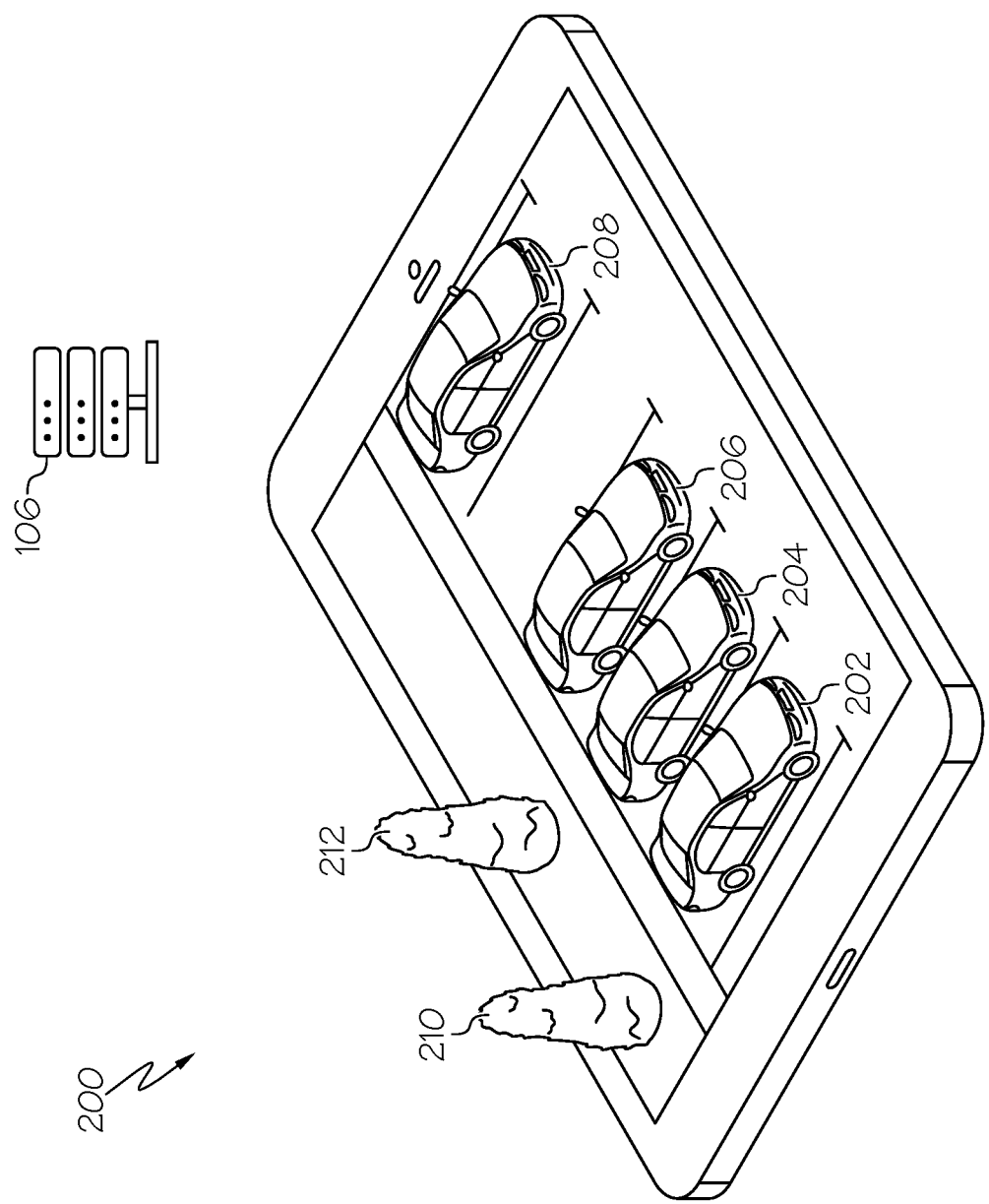
FIG. 2 depicts an example outdoor parking lot that may utilize the system of FIG. 1, according to one or more embodiments shown and described herein.

FIG. 2 shows an example outdoor parking lot 200, in which solar electric vehicles 202, 204, 206, and 208 are parked. As can be seen in FIG. 2, trees 210 and 212 are positioned behind vehicles 202, 204, and 206, whereas there are no trees positioned behind vehicle 208. As such, vehicles 202, 204, 206 may be partially shaded by the trees 210 and 212, depending on the position of the sun, which may limit the amount of sunlight they are exposed to. This may limit the rate at which vehicles 202, 204, 206 can charge their batteries via solar power. Whereas, vehicle 208 is not shaded by any trees, and as such, may be exposed to more sunlight than vehicles 202, 204, 206. Thus, vehicle 208 may charge its battery via solar power more quickly than vehicles 202, 204, 206.

In the illustrated example, when any of the vehicles 202, 204, 206, 208 are parked in the parking lot 200, the vehicles 202, 204, 206, 208 may measure the rate at which their respective batteries are being charged by solar power, and may transmit this information to the server 106. The vehicles 202, 204, 206, 208 may also transmit the current date and the time of day and transmit this information to the server 106 as well. The server 106 may receive and record this information in a database and use the recorded information to maintain a map of parking spots and how quickly solar electric vehicles can charge at each of the parking spots. For example, the map maintained by the server 106 may indicate that the parking spot occupied by vehicle 208 in FIG. 2 allows for faster solar charging than the parking spots occupied by vehicles 202, 204, 206 in FIG. 2. The map maintained by the server 106 may also indicate different expected solar charging rates for different times of day or days of the year (e.g., depending on the season or the position of the sun at different times throughout the day). The server 106 may then use this map of parking spots to determine a parking spot for a vehicle upon receiving a request for parking assistance from a connected solar electric vehicle.

Figure 3:
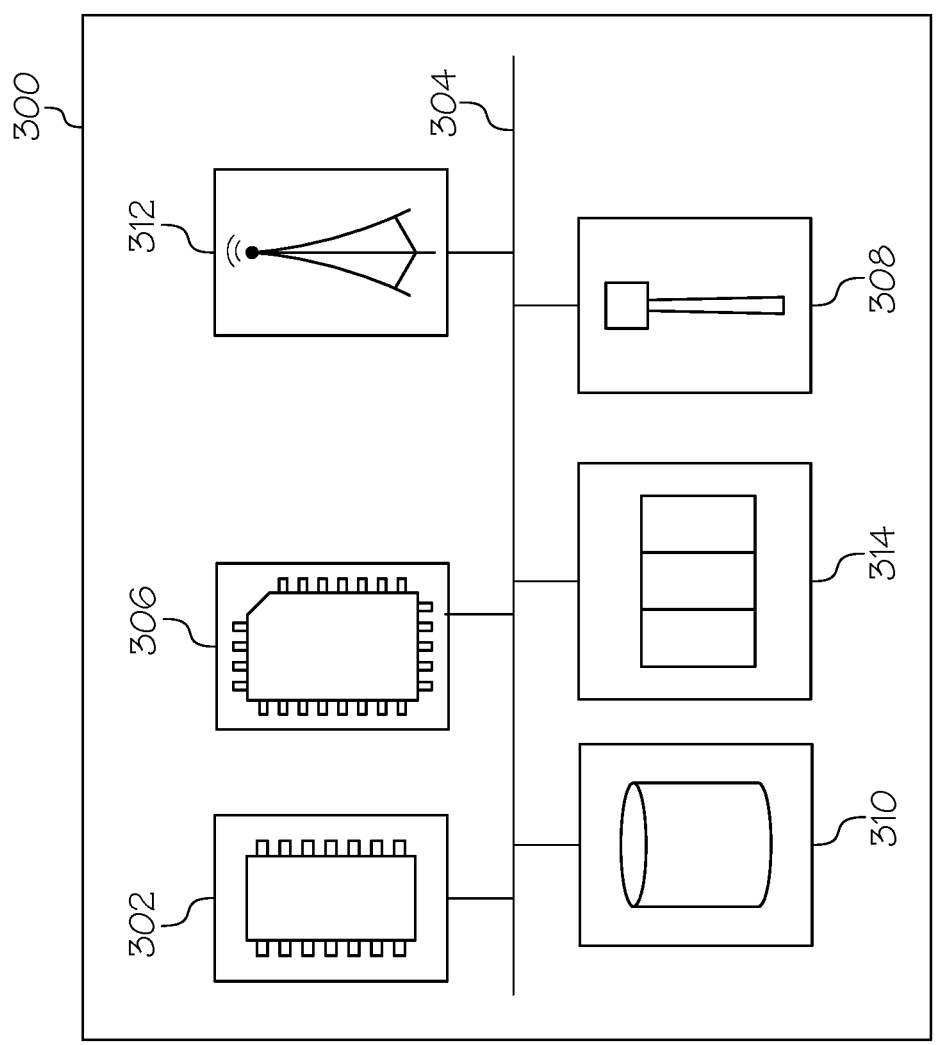
FIG. 3 schematically depicts an example vehicle system of the system of FIG. 1, according to one or more embodiments shown and described herein.

FIG. 3 depicts a vehicle system 300 that may be included in one or more of the vehicles 102, 202, 204, 206, and/or 208 of FIGS. 1 and 2. The vehicle system 300 may represent a vehicle system included in an autonomous vehicle, a semi-autonomous vehicle, or a human-driven vehicle. However, certain components of the vehicle system 300 of FIG. 3 may not be included in certain vehicle types in some examples, as disclosed herein.

In the example of FIG. 3, the vehicle system 300 includes one or more processors 302, a communication path 304, one or more memory modules 306, a satellite antenna 308, one or more vehicle sensors 310, a network interface hardware 312, and one or more solar panels 314, the details of which will be set forth in the following paragraphs.

Each of the one or more processors 302 may be any device capable of executing machine readable and executable instructions. Accordingly, each of the one or more processors 302 may be a controller, an integrated circuit, a microchip, a computer, or any other computing device. The one or more processors 302 are coupled to a communication path 304 that provides signal interconnectivity between various modules of the system. Accordingly, the communication path 304 may communicatively couple any number of processors 302 with one another, and allow the modules coupled to the communication path 304 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 304 may be formed from any medium that is capable of transmitting a signal such as, for example, conductive wires, conductive traces, optical waveguides, or the like. In some embodiments, the communication path 304 may facilitate the transmission of wireless signals, such as WiFi, Bluetooth®, Near Field Communication (NFC) and the like. Moreover, the communication path 304 may be formed from a combination of mediums capable of transmitting signals. In one embodiment, the communication path 304 comprises a combination of conductive traces, conductive wires, connectors, and buses that cooperate to permit the transmission of electrical data signals to components such as processors, memories, sensors, input devices, output devices, and communication devices. Accordingly, the communication path 304 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 300 includes one or more memory modules 306 coupled to the communication path 304. The one or more memory modules 306 may comprise RAM, ROM, flash memories, hard drives, or any device capable of storing machine readable and executable instructions such that the machine readable and executable instructions can be accessed by the one or more processors 302. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 306. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 3, the vehicle system 300 comprises a satellite antenna 308 coupled to the communication path 304 such that the communication path 304 communicatively couples the satellite antenna 308 to other modules of the vehicle system 300. The satellite antenna 308 is configured to receive signals from global positioning system satellites. Specifically, in one embodiment, the satellite antenna 308 includes one or more conductive elements that interact with electromagnetic signals transmitted by global positioning system satellites. The received signal is transformed into a data signal indicative of the location (e.g., latitude and longitude) of the satellite antenna 308, and consequently, the vehicle containing the vehicle system 300.

The vehicle system 300 comprises one or more vehicle sensors 310. Each of the one or more vehicle sensors 310 is coupled to the communication path 304 and communicatively coupled to the one or more processors 302. In embodiments, the vehicle sensors 310 may monitor the rate at which the solar panels 314 charge a battery of the vehicle, referred to herein as a charging rate or a solar charging rate. The solar charging rate may be affected by how much sunlight the vehicle is receiving. This information may be used by the server 106 to maintain a parking map, as disclosed herein.

Still referring to FIG. 3, the vehicle system 300 comprises network interface hardware 312 for communicatively coupling the vehicle system 300 to the server 106. The network interface hardware 312 can be communicatively coupled to the communication path 304 and can be any device capable of transmitting and/or receiving data via a network. Accordingly, the network interface hardware 312 can include a communication transceiver for sending and/or receiving any wired or wireless communication. For example, the network interface hardware 312 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 312 includes hardware configured to operate in accordance with the Bluetooth® wireless communication protocol.

In embodiments, the network interface hardware 312 of the vehicle system 300 may transmit data gathered by the vehicle sensors 310 about rates of solar electric charging. The network interface hardware 312 may also transmit data about the location of the vehicle while it is charging. The server 106 may receive this data and may utilize the data to manage and maintain the map of parking spots, as described in further detail below.

In embodiments, the network interface hardware 312 may also transmit requests for parking assistance to the server 106. The network interface hardware 312 may also receive recommended locations of parking spots from the server 106 in response to sending a request for parking assistance to the server 106.

Still referring to FIG. 3, the vehicle system 300 comprises one or more solar panels 314. The solar panels may be attached to an external surface of a vehicle and may receive sunlight, convert the received sunlight into electricity, and use the electricity to charge a battery and/or operate the vehicle and/or electrical components thereof. In some examples that utilize another methodology to charge a battery of the vehicle (e.g., wind or vibration), the solar panels 314 may be replaced with an another device or component to charge the vehicle battery utilizing a particular methodology.

In some embodiments, the vehicle system 300 may be communicatively coupled to the server 106 by a network. In one embodiment, the network may include one or more computer networks (e.g., a personal area network, a local area network, or a wide area network), cellular networks, satellite networks and/or a global positioning system and combinations thereof. Accordingly, the vehicle system 300 can be communicatively coupled to the network via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Figure 4:
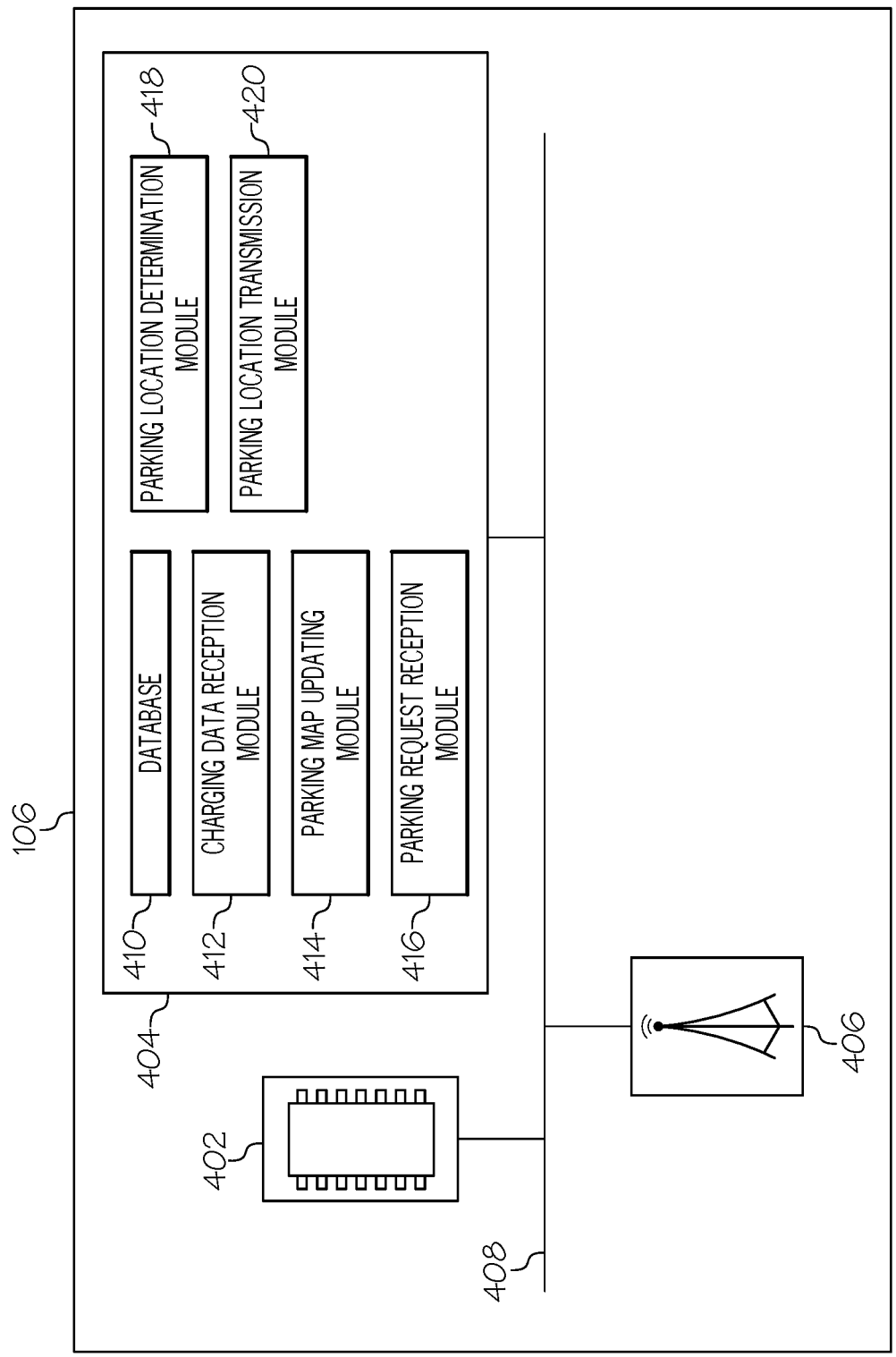
FIG. 4 schematically depicts an example server of the system of FIG. 1, according to one or more embodiments shown and described herein.

Now referring to FIG. 4, the server 106 comprises one or more processors 402, one or more memory modules 404, network interface hardware 406, and a communication path 408. The one or more processors 402 may be a controller, an integrated circuit, a microchip, a computer, or any other computing device. The one or more memory modules 404 may comprise RAM, ROM, flash memories, hard drives, or any device capable of storing machine readable and executable instructions such that the machine readable and executable instructions can be accessed by the one or more processors 402.

The network interface hardware 406 can be communicatively coupled to the communication path 408 and can be any device capable of transmitting and/or receiving data via a network. Accordingly, the network interface hardware 406 can include a communication transceiver for sending and/or receiving any wired or wireless communication. For example, the network interface hardware 406 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 406 includes hardware configured to operate in accordance with the Bluetooth® wireless communication protocol. In some examples, the network interface hardware 406 may include two different channels including a Dedicated Short-Range Communication (DSRC) channel and a millimeter wave radio channel, as discussed in further detail below. The network interface hardware 406 of the server 106 may transmit and receive data to and from connected vehicles (e.g., the vehicles 102, 202, 204, 206, 208 of FIGS. 1 and 2).

The one or more memory modules 404 include a database 410, a charging data reception module 412, a parking map updating module 414, a parking request reception module 416, a parking location determination module 418, and a parking location transmission module 420. Each of the database 410, the charging data reception module 412, the parking map updating module 414, the parking request reception module 416, the parking location determination module 418, and the parking location transmission module 420 may be a program module in the form of operating systems, application program modules, and other program modules stored in the one or more memory modules 404. In some embodiments, the program module may be stored in a remote storage device that may communicate with the server 106. In some embodiments, one or more of the database 410, the charging data reception module 412, the parking map updating module 414, the parking request reception module 416, the parking location determination module 418, and the parking location transmission module 420 may be stored in the one or more memory modules 306 of the vehicle system 300 of a vehicle. Such a program module may include, but is not limited to, routines, subroutines, programs, objects, components, data structures and the like for performing specific tasks or executing specific data types as will be described below.

The database 410 may store charging data received from vehicles (e.g., the vehicles 202, 204, 206, 208 of FIG. 2). The database 410 may also store a map of parking spots and associated expected charging rates, as disclosed in further detail herein. The database 410 may also store other data that may be used by the memory modules 404 and/or other components of the server 106.

The charging data reception module 412 may receive charging data from one or more connected vehicles (e.g., the vehicles 202, 204, 206, 208 of FIG. 2). In the illustrated example, the charging data reception module 412 may receive solar charging data from solar electric vehicles. However, in other examples, the charging data reception module 412 may receive other types of charging data.

As explained above, in the illustrated example, the vehicle system 300 includes one or more solar panels 314 that charge a vehicle battery and sensors 310 that measure the solar charging rate at which the solar panels 314 charge the vehicle battery. The solar charging rate may change depending on a variety of factors including where a vehicle is parked, the time of year, the time of day, the weather, and the like. As such, as a solar electric vehicle charges its battery, the sensors 310 may measure the charging rate and the network interface hardware 312 may transmit the charging rate to the server 106 along with the date and time, and the location of the vehicle. The charging rate may be received by the charging data reception module 412 and may be stored in the database 410. In some examples, a vehicle may not transmit a date and time and instead, the server 106 may record the date and time at which the charging data is received.

Referring still to FIG. 4, the parking map updating module 414 may update the parking map maintained by the server 106 based on charging data received by the charging data reception module 412. The parking map maintained by the server 106 may include locations of a plurality of parking spots and an expected charging rate at each parking spot. An expected charging rate may be a charging rate that a vehicle can expect to be able to charge the vehicle's battery at a particular location and/or date and time. In some examples, the parking map maintained by the server 106 may include expected charging rates at different locations depending on the time of day and/or the day of the year when charging occurs. The parking map may be stored in the database 410.

When the charging data reception module 412 receives charging data from a connected vehicle, the parking map updating module 414 may update the parking map based on the received data. If charging data is received for a location for which the server 106 has not previously received any charging data, then the parking map updating module 414 may update the parking map to associate that location with the received charging rate at that location. If charging data is received for a location for which the server 106 has previously received charging data, then the parking map updating module 414 may update the parking map to associate that location with a charging rate based on the multiple charging rates received at that location. For example, if the server 106 receives charging rates from multiple vehicles at a particular location, the parking map updating module 414 may average the charging rates together to determine an expected charging rate. In other examples, the server 106 may combine the multiple charging rates in other ways to determine an expected charging rate.

An expected charging rate indicated in the parking map may indicate an expected value of a rate that a vehicle parked at a particular location can expect to charge its battery utilizing solar power. However, the actual charging rate experienced by a solar electric vehicle may vary due to a variety of factors such as weather, measurement uncertainty, and the like. Over time, as the server 106 receives more charging data, the parking map updating module 414 may continue to update the expected parking rates such that they may become more accurate over time.

In some examples, the parking map maintained by the server 106 may include expected parking rates at different times or dates. For example, if the charging data reception module 412 receives charging data including a charging rate from a vehicle at a particular location in the morning, the parking map updating module 414 may associate that location with that expected charging rate in the morning. If the charging data reception module 412 receives charging data including a different charging rate from a vehicle at the same location in the afternoon, the parking map updating module 414 may associate that location with that expected charging rate in the afternoon. The parking map updating module 414 may also update the parking map to associate different locations with different charging rates based on the date (e.g., by season, month, specific date, and the like).

In some examples, for times of day or days of the year that the server 106 has not received charging data, the parking map updating module 414 may determine an expected charging rate by extrapolating from other data using regression and/or other data analysis techniques. For example, if the server receives charging data indicating a first charging rate at a particular location at 8:00 A.M. and a second charging rate at 2:00 P.M., then the parking map updating module 414 may determine an expected charging rate at 11:00 A.M. having a value between the first and second charging rates. In embodiments, after the parking map updating module 414 updates the parking map, the updated parking map may be stored in the database 410.

Referring still to FIG. 4, the parking request reception module 416 may receive a request from a connected vehicle for parking assistance (e.g., from the vehicle 102 of FIG. 1). In particular, the parking request reception module 416 may receive a request for a parking spot having a capacity to receive solar power. As discussed above, a request for parking assistance may include a variety of preferences or parameters. For example, a request for parking assistance may indicate a desire for the closest parking spot to a particular location (e.g., a current vehicle location) that has an expected charging rate above a threshold value. In another example, a request for parking assistance may indicate a desire for a parking spot that has the largest expected charging rate within a threshold distance from a particular location (e.g., a current vehicle location or a target location, such as an entrance to a store or any other specified destination). In some examples, a request for parking assistance may specify a future time at which parking is desired. For example, the parking request reception module 416 may receive a request from a vehicle for a parking spot near a specific location at a specific time (e.g., while a driver of the vehicle goes shopping).

In some examples, the parking request reception module 416 may receive requests to meet other parameters other than the best parking spots for solar charging a vehicle. For example, the parking request reception module 416 may receive a request from a connected vehicle for a parking spot that has a minimum amount of sun. For example, instead of looking for a parking spot to best charge a vehicle using solar power, a user may desire a parking spot that is well shaded such that the vehicle will not become excessively hot while parked. The parking map maintained by the server 106 may be utilized to provide a parking spot meeting this criteria as well.

The parking location determination module 418 may determine a location of a parking spot based on a request for parking assistance received by the parking request reception module 416. In particular, the parking location determination module 418 may access the parking map stored in the database 410 and may identify the parking spot that best matches the parameters of the request for parking assistance received by the parking request reception module 416. As discussed above, the database 410 stores a parking map that includes locations of parking spots and expected charging rates of each of the parking spots at different dates and times. Thus, when the parking request reception module 416 receives a request for parking assistance with certain parameters regarding location and expected charging rate, the parking location determination module 418 may search the parking map to identify the parking spot that best meets the parameters of the received request. For example, the parking location determination module 418 may identify the closest parking spot that has an expected charging rate above a specified threshold or may identify the parking spot with the highest expected charging rate that is within a specified threshold distance.

In some examples, the parking location determination module 418 may determine that time that a request for parking assistance is received. For example, if the parking request reception module 416 receives a request for parking assistance in the morning, the parking location determination module 418 may search the parking map for expected charging times in the morning. Alternatively, if the parking request reception module 416 receives a request for parking assistance in the afternoon, the parking location determination module 418 may search the parking map for expected charging times in the afternoon.

In some examples, if the parking request reception module 416 receives a request for parking assistance at a specified future time, the parking location determination module 418 may search the parking map for charging times at the specified future time. In some examples, the parking location determination module 418 may consider the date that a request is received. For example, if a request is received during the summer, the parking location determination module 418 may search the parking map based on expected charging times in the summer months.

Referring still to FIG. 4, the parking location transmission module 420 may cause the network interface hardware 406 to transmit the location of the parking spot determined by the parking location determination module 418 to the vehicle that requested parking assistance. The requesting vehicle may receive the location of the determined parking spot and then travel to and park at the parking spot where the vehicle battery may be charged.

Figure 5:
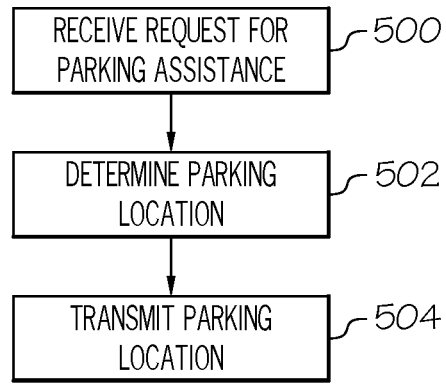
FIG. 5 depicts a flowchart for a method that may be implemented by the system of FIG. 1, according to one or more embodiments shown and described herein.

FIG. 5 depicts a flowchart for a method that may be implemented by the server 106 for identifying efficient parking spots for solar charging. In particular, the method of FIG. 5 may be implemented by the server 106 to provide parking assistance to a requesting vehicle.

At step 500, the parking request reception module 416 receives a request for parking assistance from a connected vehicle. In embodiments, the request is received from a solar charging vehicle seeking a parking spot where the vehicle can be efficiently charged. The request for parking assistance may include certain preferences or parameters indicating the type of parking spot desired, which may be based on location and/or expected charging rate, among other things. In some examples, the request for parking assistance may specify a time and/or a date when parking assistance is desired.

At step 502, the parking location determination module 418 determines a location of a parking spot based on the request for parking assistance received by the parking request reception module 416. In embodiments, the parking location determination module 418 may access the parking map stored in the database 410 to determine the location of the parking spot that best suits the request received by the parking request reception module 416. At step 504, the parking location transmission module 420 transmits the location of the parking spot determined by the parking location determination module 418 to the vehicle that requested the parking assistance.

Figure 6:
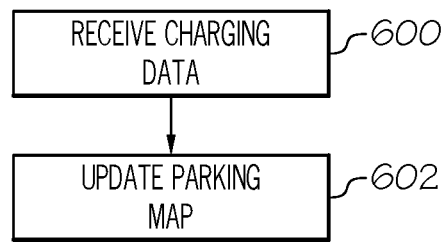
FIG. 6 depicts a flowchart for another method that may be implemented by the system of FIG. 1, according to one or more embodiments shown and described herein.

FIG. 6 depicts a flowchart for another method that may be implemented by the server 106 for identifying efficient parking spots for solar charging. In particular, the method of FIG. 6 may be implemented by the server 106 to receive charging data from connected vehicles and maintain a parking map.

At step 600, the charging data reception module 412 receives charging data from one or more connected vehicles. In embodiments, the received charging data includes a location that a connected vehicle is parked and the charging rate of the vehicle at that location. In the illustrated example, the charging rate comprises the rate at which the battery of the vehicle is being charge via solar power. In other examples, the charging rate may comprise the rate at which the battery of the vehicle is being charged by other means.

The charging data reception module 412 may continue to receive charging data from the connected vehicle as the battery of the vehicle charges. For example, the charging data reception module 412 may periodically receive a charging rate of the vehicle while the vehicle battery is being charged at a particular location. In some examples, the charging data received by the charging data reception module 412 may also include a date and/or time that the charging occurs. In other examples, the charging data reception module 412 may add the date and time that the charging data is received to the charging data so that the date and time that charging occurs can be recorded.

At step 602, the parking map updating module 414 updates the parking map stored in the database 410 based on the charging data received by the charging data reception module 412. The parking map stored in the database 410 may include locations of one or more parking spots and expected charging rates at each of the locations. In some examples, the parking map stored in the database 410 may include expected charging rates at different locations at different times of day and/or days of the year. After the parking map is updated, the server 106 may utilize the parking map to provide parking assistance to requesting vehicles using the method of FIG. 5.

It should now be understood that embodiments described herein are directed to methods and systems for identifying efficient parking spots for solar charging. When a solar electric vehicle is parked outdoors, the vehicle may measure the charging rate at which the vehicle battery is being charged using solar power. This charging data may be transmitted to a server along with a location at which the vehicle is being charged.

The server may collect charging data from a plurality of solar electric vehicles and over time, the server may build a parking map indicating expected charging rates at a plurality of locations. A solar electric vehicle may then transmit a request for parking assistance to the server seeking a parking spot that the vehicle can be charged. The request may include parameters including a desired location or a desired charging rate. The server may search the parking map to find a parking spot based on the received request for parking assistance. The server may then transmit the location of the parking spot to the vehicle that submitted the request for parking assistance.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
receiving a request from a requesting vehicle to locate a parking spot having capacity to receive solar power;
determining a parking location having the capacity to receive solar power, based on a location of the requesting vehicle, the request, a time of day that the request is received, and a parking map that indicates an expected charging rate at each of a plurality of parking locations at a plurality of times of day; and
transmitting the determined parking location to the requesting vehicle.

2. The method of claim 1, wherein the request includes a current charging level of the requesting vehicle.

3. The method of claim 1, further comprising:
determining the parking location based on a time of day specified in the request and the parking map that indicates an expected charging rate at each of the plurality of parking locations at the plurality of times of day.

4. The method of claim 1, further comprising:
determining the parking location based on a date that the request is received and the parking map that indicates an expected charging rate at each of the plurality of parking locations at a plurality of dates.

5. The method of claim 1, further comprising:
receiving a target location from the requesting vehicle; and
determining a parking location having a maximum expected charging rate from among the plurality of parking locations within a threshold distance from the target location, wherein the threshold distance is specified in the request.

6. The method of claim 1, further comprising:
receiving a target location from the requesting vehicle; and
determining a parking location being located a minimum distance from the target location from among the plurality of parking locations having an expected charging rate above a threshold charging rate, wherein the threshold charging rate is specified in the request.

7. The method of claim 1, further comprising:
receiving a target location from the requesting vehicle; and
determining a parking location having a minimum capacity to receive solar power from among the plurality of parking locations within a threshold distance from the target location, wherein the threshold distance is specified in the request.

8. A method comprising:
receiving data from one or more solar electric vehicles parked at one or more parking locations, the data comprising a capacity to receive solar power at each parking location; and
updating a parking map indicating an expected charging rate at each of the one or more parking locations at one or more times of da based on the received data and times of day that the data is received from each of the one or more solar electric vehicles.

9. The method of claim 8, wherein the data comprises a charging rate of each of the one or more solar electric vehicles, the method further comprising:
determining the capacity to receive solar power at each parking location based on the charging rate of each of the one or more solar electric vehicles.

10. The method of claim 8, further comprising:
receiving a request from a requesting vehicle to locate a parking spot having capacity to receive solar power;
determining a parking location having the capacity to receive solar power based on a location of the requesting vehicle, the request, and the parking map; and
transmitting the determined parking location to the requesting vehicle.

11. The method of claim 10, further comprising:
receiving a target location from the requesting vehicle; and
determining the parking location having a maximum expected charging rate from among a plurality of parking locations within a threshold distance from the target location based on the parking map, wherein the threshold distance is specified in the request.

12. The method of claim 11, further comprising:
determining the parking location being located a minimum distance from the target location from among the plurality of parking locations having an expected charging rate above a threshold charging rate based on the parking map, wherein the threshold charging rate is specified in the request.

13. The method of claim 8, further comprising:
receiving a request from a requesting vehicle to locate a parking spot having capacity to receive solar power;
determining a parking location having the capacity to receive solar power based on a location of the requesting vehicle, a time of day that the request is received, and the parking map; and
transmitting the determined parking location to the requesting vehicle.

14. The method of claim 8, further comprising:
updating the parking map to indicate the expected charging rate at each of the one or more parking locations on one or more dates based on dates that the data is received from each of the one or more solar electric vehicles.

15. The method of claim 14, further comprising:
receiving a request from a requesting vehicle to locate a parking spot having capacity to receive solar power;
determining a parking location having the capacity to receive solar power based on a location of the requesting vehicle, a date that the request is received, and the parking map; and
transmitting the determined parking location to the requesting vehicle.

16. A remote computing device comprising a controller configured to:
receive a request from a requesting vehicle to locate a parking spot having capacity to receive solar power;
determine a parking location having the capacity to receive solar power, based on a location of the requesting vehicle, the request, a time of day that the request is received, and a parking map that indicates an expected charging rate at each of a plurality of parking locations at a plurality of dates and times of day; and
transmit the determined parking location to the requesting vehicle.

17. The remote computing device of claim 16, wherein the controller is further configured to:
receive data from one or more solar electric vehicles parked at one or more parking locations, the data comprising a capacity to receive solar power at each parking location;
updating the parking map indicating an expected charging rate at each of the one or more parking locations based on the received data; and
determine the parking location based on the parking map.

* * * * *

UNITED STATES PATENT AND TRADEMARK OFFICE
CERTIFICATE OF CORRECTION

| | | |
|---|---|---|
| PATENT NO. | : 11,798,415 B2 | Page 1 of 1 |
| APPLICATION NO. | : 17/471643 | |
| DATED | : October 24, 2023 | |
| INVENTOR(S) | : Masashi Nakagawa et al. | |

It is certified that error appears in the above-identified patent and that said Letters Patent is hereby corrected as shown below:

In the Claims

In Column 13, Line(s) 28, Claim 8, after "more times of", delete "da" and insert --day--, therefor.

Signed and Sealed this
Nineteenth Day of December, 2023

Katherine Kelly Vidal
*Director of the United States Patent and Trademark Office*